United States Patent
Au

(10) Patent No.: US 9,276,522 B1
(45) Date of Patent: Mar. 1, 2016

(54) MASS DAMPER FOR SOLAR TRACKER

(71) Applicant: NEXTracker Inc., Fremont, CA (US)

(72) Inventor: Alexander W. Au, El Cerrito, CA (US)

(73) Assignee: NEXTRACKER INC., Fremont, CA (US)

(*) Notice: Subject to any disclaimer, the term of this patent is extended or adjusted under 35 U.S.C. 154(b) by 0 days.

(21) Appl. No.: 14/734,981

(22) Filed: Jun. 9, 2015

(51) Int. Cl.
| | |
|---|---|
| *F24D 3/18* | (2006.01) |
| *F16F 1/36* | (2006.01) |
| *F16M 11/04* | (2006.01) |
| *F24J 2/46* | (2006.01) |
| *F24D 11/02* | (2006.01) |
| *F24D 17/02* | (2006.01) |
| *F24J 2/54* | (2006.01) |

(52) U.S. Cl.
CPC . *H02S 20/32* (2014.12); *F16F 1/36* (2013.01); *F16M 11/04* (2013.01); *F24J 2/4638* (2013.01); *F24J 2002/5496* (2013.01)

(58) Field of Classification Search
CPC ....... F16F 15/08; F16F 1/36; F16F 2224/025; F16F 2234/06; F24J 2/405; F24J 2/4638; F24J 2002/4658; F24J 2002/5496; F16M 11/04; F16B 5/0241; F16C 1/108
USPC ................ 126/571, 570, 600, 573; 74/574.4; 248/638
IPC ... H02S 20/32; F16F 1/36, 15/08; F16M 11/04; F16B 5/02; F24J 2/54
See application file for complete search history.

(56) References Cited

U.S. PATENT DOCUMENTS

| | | | | |
|---|---|---|---|---|
| 3,814,357 | A * | 6/1974 | Rontgen | F16F 1/128 248/573 |
| 5,308,675 | A * | 5/1994 | Crane | E04C 3/29 181/208 |
| 5,444,195 | A * | 8/1995 | Dojo | E04F 15/20 181/208 |
| 5,505,788 | A * | 4/1996 | Dinwoodie | F24J 2/34 136/244 |
| 6,123,313 | A * | 9/2000 | Otsuka | E04H 9/023 248/580 |
| 6,302,099 | B1 * | 10/2001 | McDermott | F24J 2/5417 126/600 |

(Continued)

FOREIGN PATENT DOCUMENTS

| | | | |
|---|---|---|---|
| JP | 2009228718 A | * | 10/2009 |
| JP | 2013164115 A | * | 8/2013 |

(Continued)

OTHER PUBLICATIONS

International Search Report and Written Opinion for PCT/US2013/073948, filed on Dec. 9, 2013.

*Primary Examiner* — Gregory Huson
*Assistant Examiner* — Daniel E Nemay
(74) *Attorney, Agent, or Firm* — Richard T. Ogawa; Ogawa P.C.

(57) ABSTRACT

In an example, the system has a mechanical isolator comprising an elastic material configured to separate the panel rail from the torque tube cause destructive interference with a natural resonant frequency of the system without the mechanical isolator to reduce a mechanical vibration of the system.

17 Claims, 18 Drawing Sheets

(56) References Cited

U.S. PATENT DOCUMENTS

| | | | |
|---|---|---|---|
| 6,409,446 B1 * | 6/2002 | Schwarz | B60R 13/0206 411/353 |
| 6,511,038 B1 * | 1/2003 | Han | F16F 15/02 248/188.8 |
| 6,820,908 B1 * | 11/2004 | Tousi | F16F 15/08 248/609 |
| 7,607,427 B2 * | 10/2009 | Yi | F24J 2/38 126/571 |
| 7,647,924 B2 * | 1/2010 | Hayden | F24J 2/4636 126/600 |
| 8,459,249 B2 | 6/2013 | Corio | |
| 8,480,052 B2 * | 7/2013 | Taylor | F16F 15/067 248/563 |
| 8,499,756 B2 * | 8/2013 | Bathurst | F24J 2/38 126/571 |
| 8,789,806 B2 * | 7/2014 | Taylor | F16F 15/067 248/562 |
| 2003/0034029 A1 | 2/2003 | Shingleton | |
| 2003/0038224 A1 * | 2/2003 | Monson | F16F 1/373 248/634 |
| 2007/0164492 A1 * | 7/2007 | Cook | F16F 1/54 267/141 |
| 2008/0283721 A1 * | 11/2008 | Brewer, III | F16F 1/373 248/634 |
| 2011/0232212 A1 * | 9/2011 | Pierson | F24J 2/045 52/173.3 |
| 2012/0091077 A1 | 4/2012 | Zuritis | |
| 2012/0180845 A1 | 7/2012 | Cole et al. | |
| 2015/0092383 A1 | 4/2015 | Corio et al. | |

FOREIGN PATENT DOCUMENTS

| | | |
|---|---|---|
| KR | 10-0896332 B1 | 5/2009 |
| WO | WO 2012/076949 A1 | 6/2012 |

* cited by examiner

DETAIL B

DETAIL E

MASS DAMPER FOR SOLAR TRACKER

BACKGROUND OF THE INVENTION

The present application relates generally to a tracking system for solar panels. More specifically, embodiments of the present invention provide a mass damper assembly for a plurality of solar modules configured for a tracking system. In a specific embodiment, the mass damper assembly according to the present invention is for selectively tuning a tracking system, among other aspects. There are other embodiments as well.

As the population of the world increases, industrial expansion has led to an equally large consumption of energy. Energy often comes from fossil fuels, including coal and oil, hydroelectric plants, nuclear sources, and others. As an example, the International Energy Agency projects further increases in oil consumption, with developing nations such as China and India accounting for most of the increase. Almost every element of our daily lives depends, in part, on oil, which is becoming increasingly scarce. As time further progresses, an era of "cheap" and plentiful oil is coming to an end. Accordingly, other and alternative sources of energy have been developed.

Concurrent with oil, we have also relied upon other very useful sources of energy such as hydroelectric, nuclear, and the like to provide our electricity needs. As an example, most of our conventional electricity requirements for home and business use come from turbines run on coal or other forms of fossil fuel, nuclear power generation plants, and hydroelectric plants, as well as other forms of renewable energy. Often times, home and business use of electrical power has been stable and widespread.

Most importantly, much if not all of the useful energy found on the Earth comes from our sun. Generally all common plant life on the Earth achieves life using photosynthesis processes from sun light. Fossil fuels such as oil were also developed from biological materials derived from energy associated with the sun. For human beings including "sun worshipers," sunlight has been essential. For life on the planet Earth, the sun has been our most important energy source and fuel for modern day solar energy.

Solar energy possesses many characteristics that are very desirable! Solar energy is renewable, clean, abundant, and often widespread. Certain technologies have been developed to capture solar energy, concentrate it, store it, and convert it into other useful forms of energy.

Solar panels have been developed to convert sunlight into energy. As an example, solar thermal panels often convert electromagnetic radiation from the sun into thermal energy for heating homes, running certain industrial processes, or driving high grade turbines to generate electricity. As another example, solar photovoltaic panels convert sunlight directly into electricity for a variety of applications. Solar panels are generally composed of an array of solar cells, which are interconnected to each other. The cells are often arranged in series and/or parallel groups of cells in series. Accordingly, solar panels have great potential to benefit our nation, security, and human users. They can even diversify our energy requirements and reduce the world's dependence on oil and other potentially detrimental sources of energy.

Although solar panels have been used successfully for certain applications, there are still limitations. Often, solar panels are unable to convert energy at their full potential due to the fact that the sun is often at an angle that is not optimum for the solar cells to receive solar energy. In the past, various types of conventional solar tracking mechanisms have been developed. Unfortunately, conventional solar tracking techniques are often inadequate. These and other limitations are described throughout the present specification, and may be described in more detail below.

From the above, it is seen that techniques for improving solar systems are highly desirable.

BRIEF SUMMARY OF THE INVENTION

The present application relates generally to a tracking system for solar panels. More specifically, embodiments of the present invention provide a mass damper assembly for a plurality of solar modules configured for a tracking system. In a specific embodiment, the mass damper assembly according to the present invention is for selectively tuning a tracking system, among other aspects. There are other embodiments as well.

In an example, the present invention provides a solar tracker system. The solar tracker system has a first pillar structure and a second pillar structure. In an example, the system has a torque tube configured between the first pillar structure and the second pillar structure and a plurality of solar modules configured spatially along the torque tube from a first end to a second end.

In an example, the system has a panel rail configured to support each of the plurality of solar modules. That is, the system has a plurality of panel rail devices coupling respective plurality of solar modules.

In an example, the system has a clamp device coupled to sandwich the torque tube between a lower portion of the clamp device and each panel rail. In an example, the clamp device is a U-bolt that has a lower region coupled to the lower region of the torque tube, and each of the bolt structures is inserted into an opening in the panel rail. The panel rail is disposed underlying a pair of solar modules and is configured to hold the pair of solar modules, while being clamped onto the torque tube using the U-bolt and a pair of bolts securing the panel rail to the torque tube.

In an example, the system has a mechanical isolator comprising an elastic material configured to separate the panel rail from the torque tube and cause destructive interference with a natural resonant frequency of the system without the mechanical isolator to reduce a mechanical vibration of the system. In an example, the elastic material comprises a rubber or a polymer that has sufficient rigidity. In an example, the material can also be configured with one or more openings to further allow the thickness of material to flex and/or absorb vibration. Further details of the system can be found throughout the present specification and more particularly below.

Various additional objects, features and advantages of the present invention can be more fully appreciated with reference to the detailed description and accompanying drawings that follow.

DESCRIPTION OF THE SPECIFIC EMBODIMENTS

The present application relates generally to a tracking system for solar panels. More specifically, embodiments of the present invention provide a clamp assembly for a glass on glass solar module configured for a tracking system. In a specific embodiment, a clamp assembly according to the present invention is for a tracking system, among other aspects. There are other embodiments as well.

Figure 1:
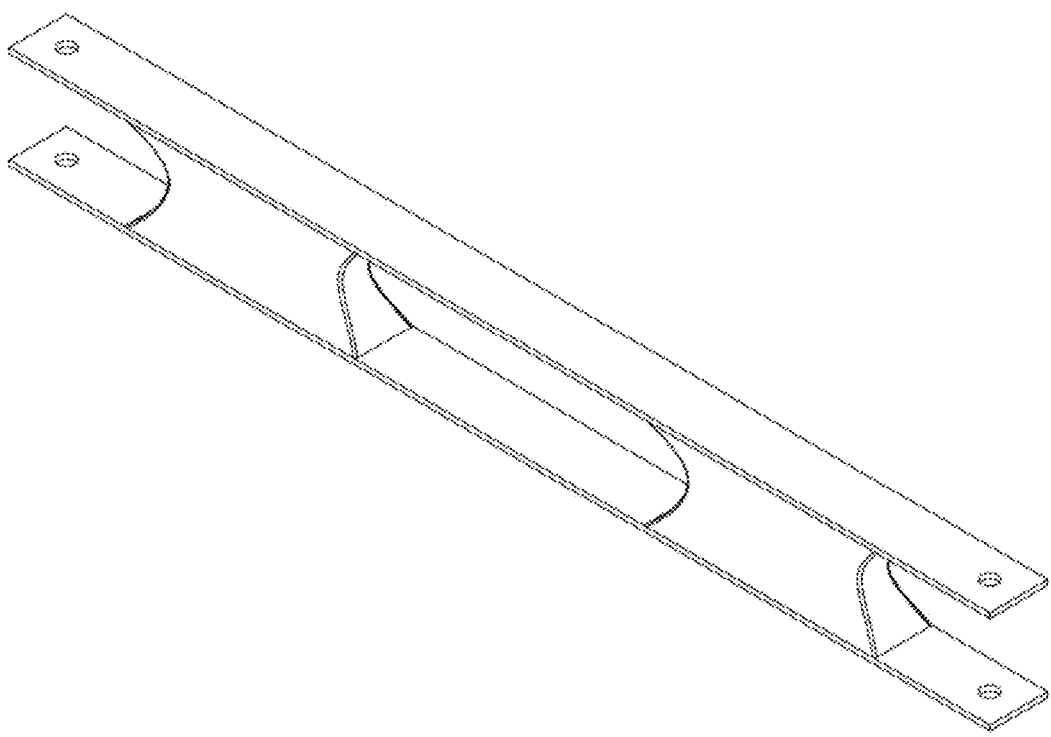
FIG. 1 is a simplified diagram in perspective view of a mass damper structure for a solar tracker system according to an embodiment of the present invention.

FIG. 1 is a simplified diagram in perspective view of a mass damper structure for a solar tracker system according to an embodiment of the present invention. As shown, the mass damper structure has a mechanical isolator structure. In an example, the mechanical isolator comprises an elastic material configured to separate a panel rail from a torque tube and cause destructive interference with a natural resonant frequency of the solar tracker system without the mechanical isolator. In an example, the mechanical isolator reduces a mechanical vibration of the solar tracker system.

In an example, the mechanical isolator comprises a rubber like material having a thickness. As shown, the mechanical isolator comprises a thickness of material having one or more openings to make the mechanical isolator more flexible in characteristics. Each of the openings traverses through the thickness of the mechanical isolator. Each of the openings is symmetrically and spatially disposed along a length of the mechanical isolator. In an example, the mechanical isolator is characterized by a narrow region along a center of the length in relationship to each edge region of the mechanical isolator (as will be shown). In an example, the mechanical isolator has a thickness of three inches and less, and a width of two inches and less. In an example, the natural resonant frequency ranges from 1 Hz to 10 Hz in a torsional mode, and 1 Hz to 5 Hz in a bending mode. In an example, the mechanical vibration leads to failure of the solar tracker system without the mechanical isolator. In an example, the mechanical vibration is derived from external wind subjected to the solar tracker system. Further details of the present structure can be found throughout the present specification and more particularly below.

Figure 2:
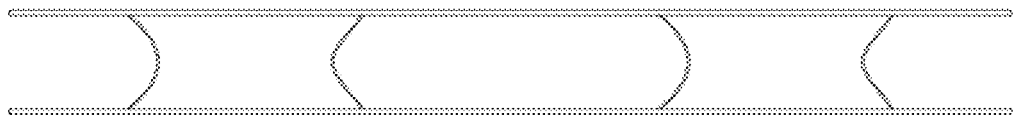
FIG. 2 is a side view of the mass damper structure according to an embodiment of the present invention.

FIG. 2 is a side view of the mass damper structure according to an embodiment of the present invention. As shown, the mechanical isolator has a constant height or thickness. Each of the edges defining the height is substantially flat to be configured to either a surface of a solar module or a brim of a top-hat rail structure in an example. Each of the ends has a pair of flanges for an adjustable spacer assembly according to an example. Each of the flanges can be derived from an overlying and an underlying strip of metal material or other rigid structure, depending upon the embodiment. The flanges can be metal, such as aluminum, steel, carbon hardened steel, a composite, or other suitable material. Further details of the present structure can be found throughout the present specification and more particularly below.

Figure 3:
FIG. 3 is a top-view or bottom view of the mass damper structure according to an embodiment of the present invention.

FIG. 3 is a top-view or bottom view of the mass damper structure according to an embodiment of the present invention. As shown, each of the top or bottom structure is substantially flat, and has a constant width, and length in an example. Further details of the present structure can be found throughout the present specification and more particularly below.

Figure 4:
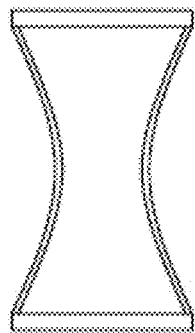
FIG. 4 is a front-view or back view of the mass damper structure according to an embodiment of the present invention.

FIG. 4 is a front-view or back view of the mass damper structure according to an embodiment of the present invention. As shown, the mass damper structure includes a mechanical isolator. The mechanical isolator has an upper edge or flat and a lower edge or flat. In an example, the thickness of the mechanical isolator is narrower in a center region and flares out on each of the edges in a symmetric manner. Further details of the present structure can be found throughout the present specification and more particularly below.

In an example, the present invention provides a solar tracker system. The solar tracker system has a first pillar structure and a second pillar structure. In an example, the system has a torque tube configured between the first pillar structure and the second pillar structure and a plurality of solar modules configured spatially along the torque tube from a first end to a second end.

In an example, the system has a panel rail configured to support each of the plurality of solar modules. That is, the system has a plurality of panel rail devices coupling respective plurality of solar modules.

In an example, the system has a clamp device coupled to sandwich the torque tube between a lower portion of the clamp device and each panel rail. In an example, the clamp device is a U-bolt that has a lower region coupled to the lower region of the torque tube, and each of the bolt structures is inserted into an opening in the panel rail. The panel rail is disposed underlying a pair of solar modules and is configured to hold the pair of solar modules, while being clamped onto the torque tube using the U-bolt and a pair of bolts securing the panel rail to the torque tube.

In an example, the system has a mechanical isolator comprising an elastic material configured to separate the panel rail from the torque tube and cause destructive interference with a natural resonant frequency of the system without the mechanical isolator to reduce a mechanical vibration of the system. Further details of the system can be found throughout the present specification and more particularly below.

Figure 5:
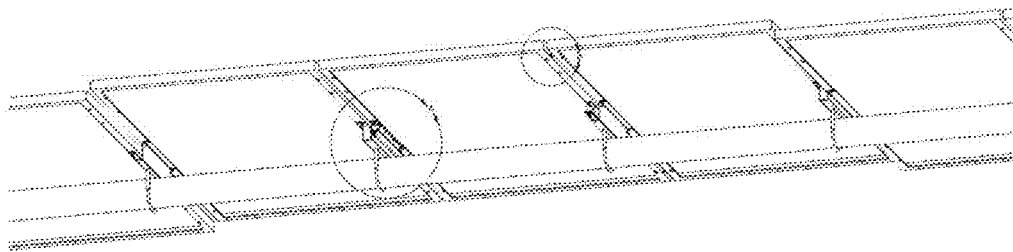
FIG. 5 is a simplified diagram of a perspective view of a solar tracker system including a mass damper structure according to an embodiment of the present invention.

FIG. 5 is a simplified diagram of a perspective view of a bottom region of a solar tracker system including a mass damper structure according to an embodiment of the present invention. As shown, the tracker has a torque tube. A plurality of panel rails is configured on the torque tube using a U-bolt clamp assembly. In an example, each panel rail is configured to a pair of solar modules, as shown, although there can be variations. In an example, the system selectively disposes a mechanical isolator on certain panel rails to tune the solar tracker system to prevent mechanical damage via wind damage to the solar tracker system. The system also shows reference letter A and reference letter B, which are further described below.

Figure 6:
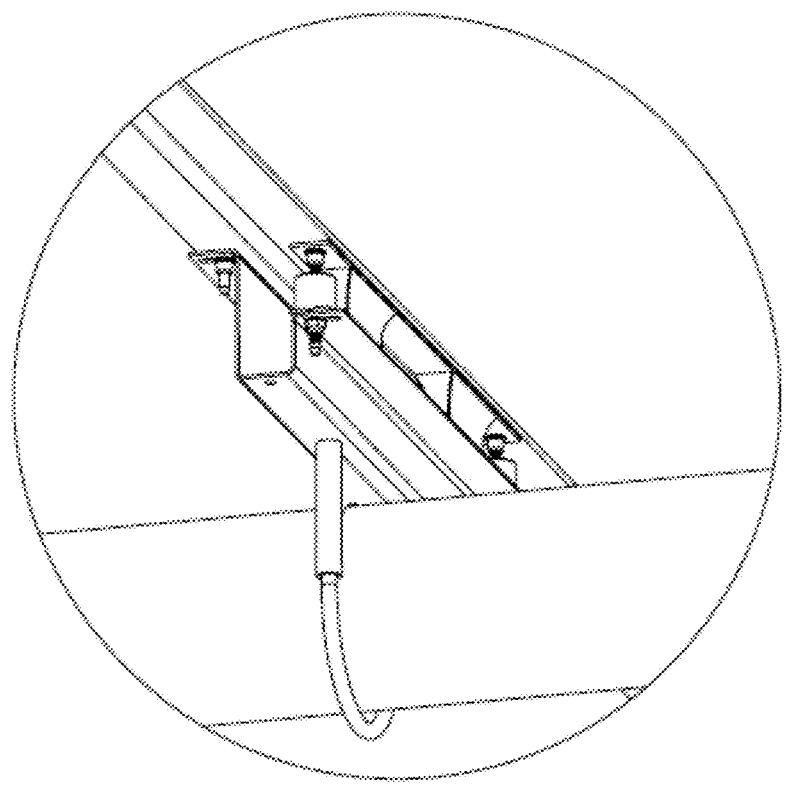
FIG. 6 is a more detailed view of reference letter A for the diagram of FIG. 5 according to an embodiment of the present invention.

FIG. 6 is a more detailed view of reference letter A for the diagram of FIG. 5 according to an embodiment of the present invention. In an example, the panel rail comprises a top-hat structure. In an example, the top hat structure comprises a top region, which has a pair of openings for the clamp device. The clamp device is a U-bolt assembly, where a lower portion of the U-bolt couples to hold the torque tube, while the two bolts protrude through the pair of openings, and are each configured with a fastener or bolt, which is secured in place. Of course, there can be other variations, modifications, and alternatives.

In an example, the top hat structure has a first side coupled to an edge of a first solar module, and a second side coupled to the mechanical isolator. In an example, the second side has a second brim region, which extends normal and out from the second side. In an example, the second brim region physically connects to the mechanical isolator. In an example, the second side characterized by a second side height and the mechanical isolator having a thickness, the second side height and the thickness is substantially equal to a first side height characterizing the first side. In an example, the mechanical isolator is coupled to an edge of a second solar module. As shown, each of the solar modules has a major plane that is substantially coincidental from each other and parallel to each other. As also shown, the mechanical isolator has a pair of flanges and has a spacer assembly provided between the pair of flanges. The spacer assembly is made of a compressible material, and has a pair of fasteners on each side. As shown, one side of the spacer assembly and lower flange is clamped with the second brim region of the top hat structure. In an example, the upper flange is coupled to a frame of a solar module. Of course, there can be other variations, modifications, and alternatives.

Figure 7:
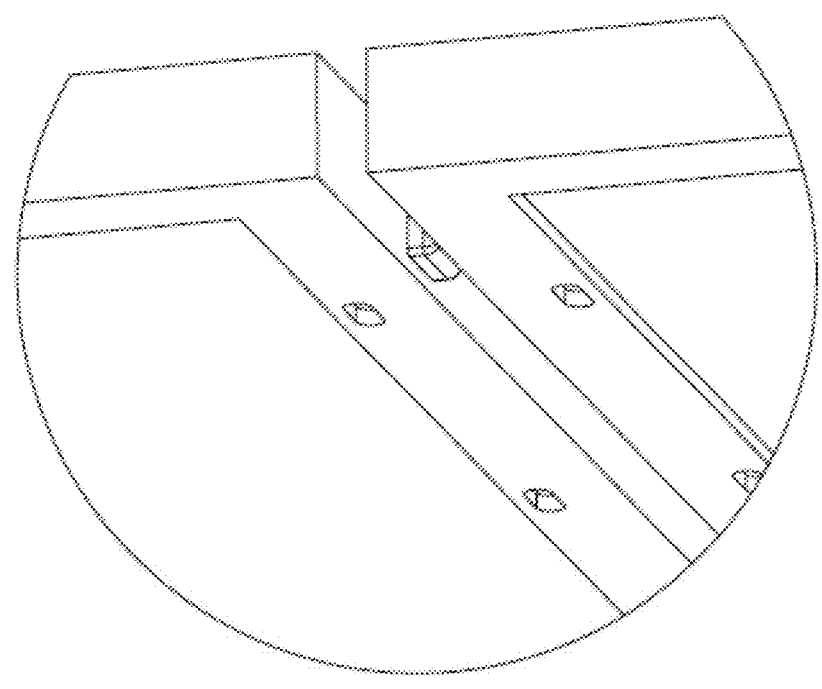
FIG. 7 is a more detailed view of reference letter B for the diagram of FIG. 5 according to an embodiment of the present invention.

FIG. 7 is a more detailed view of reference letter B for the diagram of FIG. 5 according to an embodiment of the present invention. In an example, an edge region of one of the solar module has a bumper structure provided to reduce shock and or breakage from the movement between the pair of solar panels. The bumper structure is an elastic or compressible thickness of material, which can absorb shock and/or mechanical movement and/or vibration in an example.

Figure 8:
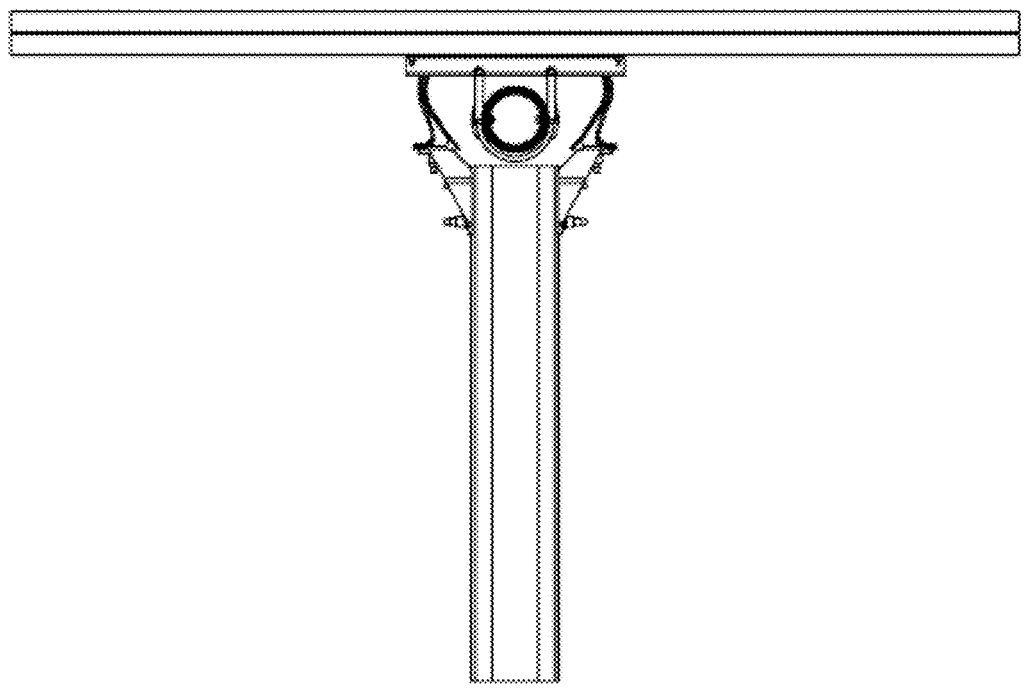
FIG. 8 is a simplified diagram of a front view of a solar tracker system including a mass damper structure according to an embodiment of the present invention.

FIG. 8 is a simplified diagram of a front view of a solar tracker system including a mass damper structure according to an embodiment of the present invention. As shown, the solar tracker has a pillar with a clamp device. The clamp device is configured to an end of the torque tube. A U-bolt assembly secures the panel rail to the torque tube in an example. The panel rail is provided to secure a pair of solar modules in an example.

Figure 9:
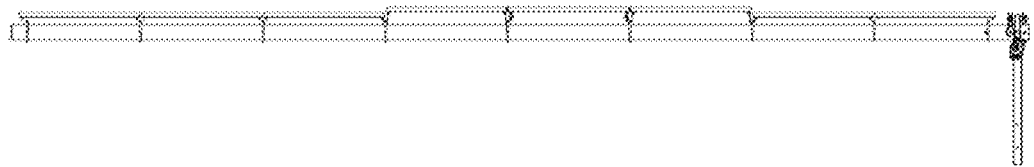
FIG. 9 is a simplified diagram of a side view of a solar tracker system including a mass damper structure, and a plurality of modules, according to an embodiment of the present invention.

FIG. 9 is a simplified diagram of a side view of a solar tracker system including a mass damper structure, and a plurality of modules, according to an embodiment of the present invention. As shown, the solar tracker has a pillar with a clamp device. The clamp device is configured to an end of the torque tube. A U-bolt assembly secures the panel rail to the torque tube in an example. The panel rail is provided to secure a pair of solar modules in an example. In an example, the solar tracker system has a mechanical isolator structure on selected solar modules, while others are not configured with a mechanical isolator. In an example, the use of the mechanical isolator selectively tunes the solar system to prevent oscillation and mechanical vibration that can lead to breakage or constructive interference of a resonance frequency of the system without the isolator, and then leading to oscillation and breakage of the system.

Figure 10:
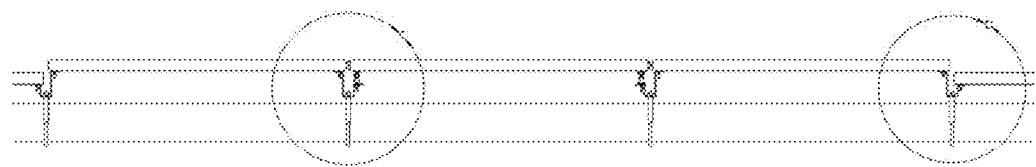
FIG. 10 is a more detailed diagram of a side view of a solar tracker system including a mass damper structure, and a plurality of modules, according to an embodiment of the present invention.

FIG. 10 is a more detailed diagram of a side view of a solar tracker system including a mass damper structure, and a plurality of modules, according to an embodiment of the present invention. As shown, the solar tracker has a plurality of solar modules. In an example, a U-bolt assembly secures the panel rail to the torque tube in an example. The panel rail is provided to secure a pair of solar modules in an example. In an example, the solar tracker system has a mechanical isolator structure on selected solar modules, while others are not configured with a mechanical isolator. In an example, the use of the mechanical isolator selectively tunes the solar system to prevent oscillation and mechanical vibration that can lead to breakage or constructive interference of a resonance frequency of the system without the isolator, and then leading to oscillation and breakage of the system. In an example, panel rail and module under reference letter C includes use of the mechanical isolator, while reference letter D does not includes use of the panel rail. Of course, there can be other variations, alternatives, and modifications.

Figure 11:
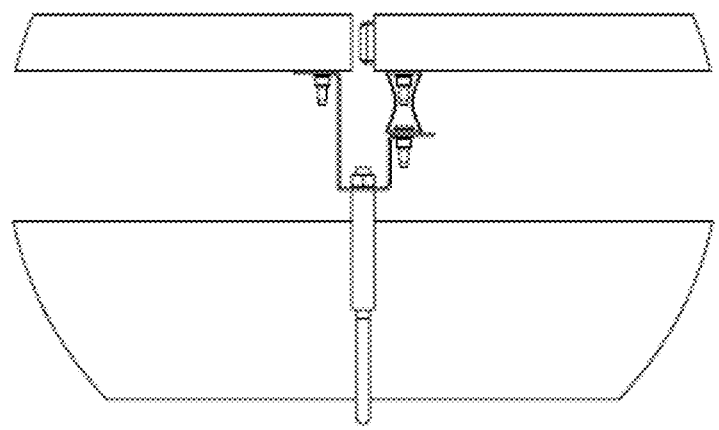
FIG. 11 is a more detailed view of reference letter C for the diagram of FIG. 10 according to an embodiment of the present invention.

FIG. 11 is a more detailed view of reference letter C for the diagram of FIG. 10 according to an embodiment of the present invention. In an example, the panel rail comprises a top-hat structure. In an example, the top hat structure comprises a top region, which has a pair of openings for the clamp device. The clamp device is a U-bolt assembly, where a lower portion of the U-bolt couples to hold the torque tube, while the two bolts protrude through the pair of openings, and are each configured with a fastener or bolt, which is secured in place. Of course, there can be other variations, modifications, and alternatives.

In an example, the top hat structure has a first side coupled to an edge of a first solar module, and a second side coupled to the mechanical isolator. In an example, the second side has a second brim region, which extends normal and out from the second side. In an example, the second brim region physically connects to the mechanical isolator. In an example, the second side characterized by a second side height and the mechanical isolator having a thickness, the second side height and the thickness is substantially equal to a first side height characterizing the first side. In an example, the mechanical isolator is coupled to an edge of a second solar module. As shown, each of the solar modules has a major plane that is substantially coincidental from each other and parallel to each other. As also shown, the mechanical isolator has a pair of flanges, which has a spacer assembly provided between the pair of flanges. The spacer assembly is made of a compressible material, and has a pair of fasteners on each side. As shown, one side of the spacer assembly and lower flange is clamped with the second brim region of the top hat structure. In an example, the upper flange is coupled to a frame of a solar module. Of course, there can be other variations, modifications, and alternatives.

In an example, the system also has a polymeric or rubber bumper structure configured on either the first solar module or second solar module and provided between the first solar module and the second solar module. In an example, the bumper structure softens or lessens an impact of each of the edges of the solar panels colliding with each other during a windstorm or other ambient condition. Of course, there can be other variations, modifications, and alternatives.

Figure 12:
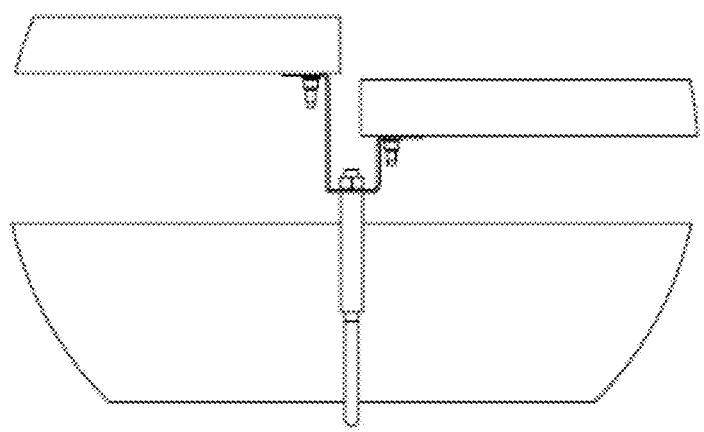
FIG. 12 is a more detailed view of reference letter D for the diagram of FIG. 10 according to an embodiment of the present invention.

FIG. 12 is a more detailed view of reference letter D for the diagram of FIG. 10 according to an embodiment of the present invention. In an example, the panel rail comprises a top-hat structure. In an example, the top hat structure comprises a top region, which has a pair of openings for the clamp device. The clamp device is a U-bolt assembly, where a lower portion of the U-bolt couples to hold the torque tube, while the two bolts protrude through the pair of openings, and are each configured with a fastener or bolt, which is secured in place. Of course, there can be other variations, modifications, and alternatives.

In an example, the top hat structure has a first side coupled to an edge of a first solar module, and a second side coupled to an edge of a second solar module. In an example, the second side has a second brim region, which extends normal and out from the second side. In an example, the second brim region physically connects to the edge of the second solar module, which is not co-planar with the first solar module. In an example, the second side is characterized by a second side height that is less than a first side height characterizing the first side. As shown, each of the solar modules has a major plane that is not coincidental from each other but is parallel to each other. Of course, there can be other variations, modifications, and alternatives.

Figure 13:
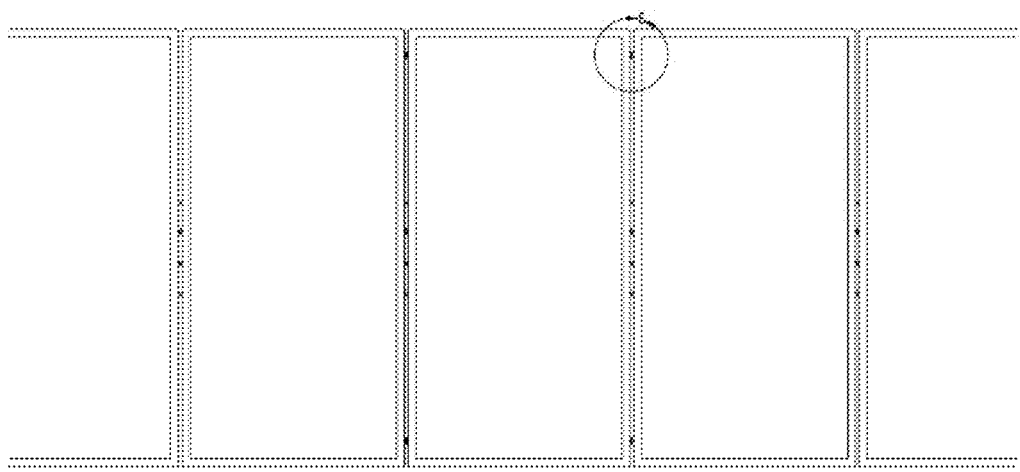
FIG. 13 is a simplified diagram of a top view of a solar tracker system including a mass damper structure between a pair of modules, according to an embodiment of the present invention.

FIG. 13 is a simplified diagram of a top view of a solar tracker system including a mass damper structure between a pair of modules, according to an embodiment of the present invention. A pair of solar modules is configured with a bumper in between to prevent breakage or reduce shock between the pair of modules. Further details of the bumper can be found throughout the present specification and more particularly below.

Figure 14:
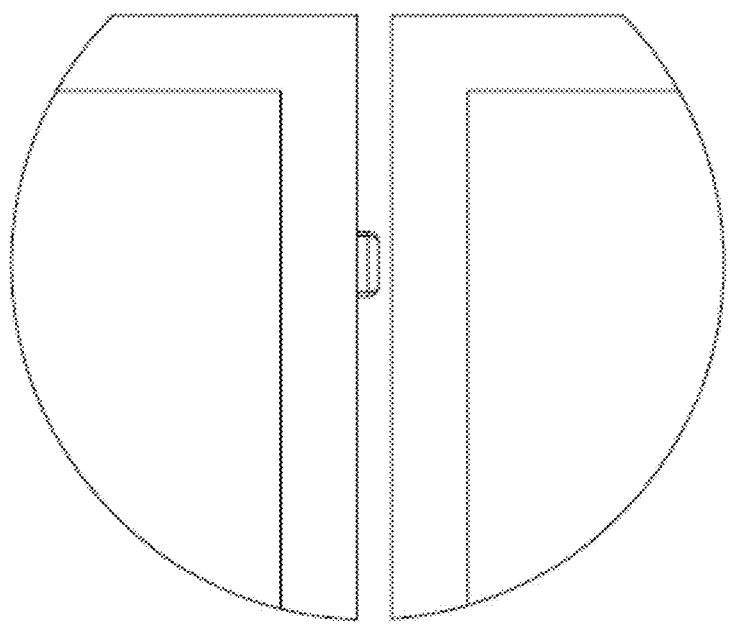
FIG. 14 is a more detailed view of reference letter E for the diagram of FIG. 13 according to an embodiment of the present invention.

FIG. 14 is a more detailed view of reference letter E for the diagram of FIG. 13 according to an embodiment of the present invention. In an example, the system also has a polymeric or rubber bumper structure configured on either the first solar module or second solar module and provided between the first solar module and the second solar module. In an example, the bumper structure softens or lessens an impact of each of the edges of the solar panels colliding with each other during a windstorm or other ambient condition. Of course, there can be other variations, modifications, and alternatives.

Figure 15:
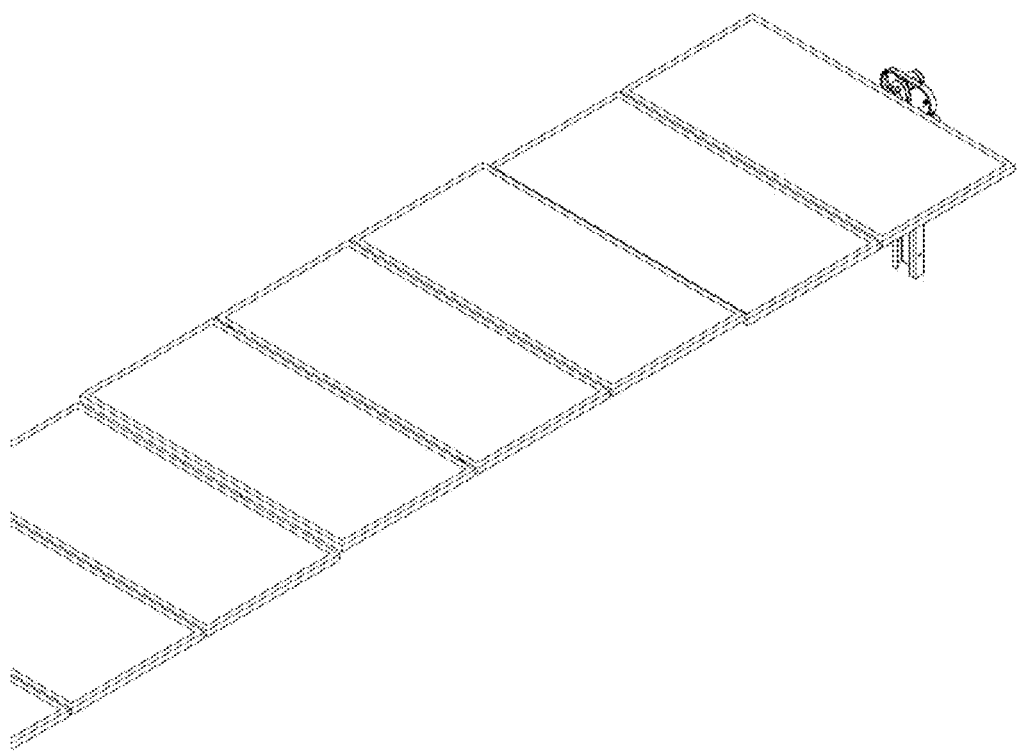
FIG. 15 is a simplified diagram of a perspective top view of a solar tracker system including a mass damper structure according to an embodiment of the present invention.

FIG. 15 is a simplified diagram of a perspective top view of a solar tracker system including a mass damper structure according to an embodiment of the present invention. As shown, the diagram shows a plurality of solar modules, each of them being selectively tuned to prevent mechanical failure during a wind storm or other external event that leads to oscillation of the system that can lead to breakage without the mechanical isolator. Further details of other elements of the tracker system can be found throughout the present specification and more particularly below.

As shown, the present invention provides a tracker apparatus for solar modules. In an example, the solar modules can be a silicon based solar module, a polysilicon based solar module, a concentrated solar module, or a thin film solar module, including cadmium telluride (CdTe), copper indium gallium selenide (CuIn1–xGaxSe2 or CIGS), which is a direct bandgap semiconductor useful for the manufacture of solar cells, among others. As shown, each of the solar panels can be arranged to form an array. Of course, there can be other variations. In an example, the first pier and the second pier are provided on a sloped surface, an irregular surface, or a flat surface. The first pier and the second pier are two of a plurality of piers provided for the apparatus. In example, the apparatus has a solar module configured in a hanging position or a supporting position.

The tracker apparatus has a first pier comprising a first pivot device and a second pier comprising a drive mount. In an example, the first pier is made of a solid or patterned metal structure, such as a wide beam flange or the like, as shown. In an example, each of the piers is inserted into the ground, and sealed, using cement or other attachment material. Each pier is provided in generally an upright position and in the direction of gravity, although there can be variations. In an example, each of the piers is spatially spaced along a region of the ground, which may be flat or along a hillside or other structure, according to an embodiment. In an example, the first pillar comprises a wide flange beam. In an example, the first pillar and the second pillar can be off-set and reconfigurable.

In an example, the drive mount is capable for construction tolerances in at least three-axis, and is configured to a drive device. The drive device has an off-set clamp device coupled to a bearing device coupled to a clamp member.

In an example, the apparatus has a cylindrical torque tube operably disposed on the first pier and the second pier. In an example, the cylindrical torque tube comprises a one to ten inch diameter pipe made of Hollow Structure Steel (HSS) steel. The cylindrical torque tube comprises a first end and a second end, and a notch. The notch is one of a plurality of notches spatially disposed along a length of the cylindrical torque tube.

In an example, the apparatus has a clamp configured around an annular portion of the cylindrical torque tube and mate with the notch to prevent movement of the clamp. The clamp comprises a support region configured to support a portion of a solar module. The clamp comprises a pin configured with the notch. The apparatus also has a rail or clamp assembly configured to the clamp. The rail or clamp assembly comprises a thread region configured to hold a bolt, which is adapted to screw into the thread and bottom out against a portion of cylindrical torque tube such that the clamp is desirably torqued against the cylindrical torque tube. The apparatus has a solar module attached to the rail or other attachment device-shared module claim or other devices. The cylindrical torque tube is one of a plurality of torque tubes configured in as a continuous structure and extends in length for 80 to 200 meters. Each pair of torque tubes is swage fitted together, and bolted for the configuration.

In an example, the apparatus also has a center of mass of along an axial direction is matched with a pivot point of the drive device. The pivot point of the drive device is fixed in three dimensions while rotating along the center of mass. In an example, the off-set clamp comprises a crank device. In an example, the first pivot device comprises a pivot device configured a clamp device to secure the first end to the cylindrical torque tube. In other examples, the drive device comprises a slew gear. In other examples, the first pivot device can include other variations. The apparatus also has an overrun device configured with the first pivot device. The overrun device comprises a mechanical stop to allow the cylindrical torque tube to rotate about a desired range.

In a specific embodiment, the present invention provides a tracker apparatus for solar modules. The tracker apparatus has a first pier comprising a first pivot device and a second pier comprising a drive mount. The drive mount is capable for construction tolerances in at least three-axis, and is configured to a drive device. The drive device has an off-set clamp device coupled to a cylindrical bearing device coupled to a clamp member. The apparatus has a cylindrical torque tube operably disposed on the first pier and the second pier. The cylindrical torque tube comprises a first end and a second end, and a notch. The notch is one of a plurality of notches spatially disposed along a length of the cylindrical torque tube. The apparatus has a clamp configured around an annular portion of the cylindrical torque tube and mate with the notch to prevent movement of the clamp. The clamp comprises a support region configured to support a portion of a solar module.

In an alternative embodiment, the present invention provides an alternative solar tracker apparatus. The apparatus has a drive device, a crank coupled to the drive device and configured in an offset manner to a frame assembly. The frame assembly is coupled to a plurality of solar modules.

In an example, the apparatus has a continuous torque tube spatially disposed from a first region to a second region. The crank comprises a first crank coupled to a first side of the drive device and a second crank coupled to a second side of the drive device. The crank comprises a first crank coupled to a first side of the drive device and a second crank coupled to a second side of the drive device; and further comprises a first torque tube coupled to the first crank and a second torque tube coupled to the second crank. The crank comprises a first crank coupled to a first side of the drive device and a second crank coupled to a second side of the drive device; and further comprises a first torque tube coupled to the first crank and a second torque tube coupled to the second crank, and further comprises a first swage fitting coupling the first crank to the first torque tube and a second swage fitting coupling the second crank to the second torque tube. The apparatus also has a pier coupled to the drive device. In an example, the apparatus also has a drive mount coupled to a pier.

In an alternative embodiment, the present invention provides an alternative solar tracker apparatus. The apparatus has a center of mass with an adjustable hanger assembly configured with a clam shell clamp assembly on the adjustable hanger assembly and a cylindrical torque tube comprising a plurality of torque tubes configured together in a continuous length from a first end to a second end such that the center of mass is aligned with a center of rotation of the cylindrical torque tubes to reduce a load of a drive motor operably coupled to the cylindrical torque tube.

In an example, the drive motor is operable to move the torque tube about the center of rotation and is substantially free from a load. The center of rotation is offset from a center of the cylindrical torque tube.

In an alternative embodiment, the present invention provides a solar tracker apparatus. The apparatus has a clamp housing member configured in a upright direction. The clamp housing member comprises a lower region and an upper region. The lower region is coupled to a pier structure, and the upper region comprises a spherical bearing device. The upright direction is away from a direction of gravity. The apparatus has a clam shell clamp member coupled to the cylindrical bearing and a torque tube coupled to the spherical bearing to support the torque tube from the upper region of the clamp housing member. The torque tube is configured from an off-set position from a center region of rotation.

In an example, the apparatus is configured substantially free from any welds during assembly. Reduced welding lowers cost, improves installation time, avoids errors in installation, improves manufacturability, and reduces component count through standardized parts. The torque tube is coupled to another torque tube via a swage device within a vicinity of the clam shall clamp member. In an example, the connection is low cost, and provides for strong axial and torsional loading. The apparatus is quick to install with the pokey-yoke design. The torque tube is coupled to an elastomeric damper in line to dampen torque movement to be substantially free from formation of a harmonic waveform along any portion of a plurality of solar panels configured to the torque tube. The apparatus also has a locking damper or rigid structure to configure a solar panel coupled to the torque tube in a fixed tilt position to prevent damage to stopper and lock into a foundation-in a position that is substantially free from fluttering in an environment with high movement of air. The apparatus further comprises a controller apparatus configured in an inserter box provided in an underground region to protect the controller apparatus. The apparatus has a drive device to linearly actuate the torque tube. In an example, the apparatus uses an electrical connection coupled to a drive device. In an example, the spherical bearing allows for a construction tolerance, tracker movement, and acts as a bonding path of least resistance taking an electrical current to ground. The apparatus can be one of a plurality of tracker apparatus configured in an array within a geographic region. Each of the plurality of tracker apparatus is driven independently of each other to cause each row to stow independently at a different or similar angle.

Still further, the present invention provides a tracker apparatus comprising a clam shell apparatus, which has a first member operably coupled to a second member to hold a torque tube in place.

In an example, the apparatus also has a clamp housing operably coupled to the clam shell apparatus via a spherical bearing device such that the spherical bearing comprises an axis of rotation. The axis of rotation is different from a center of the torque tube. The apparatus further comprises a solar module coupled to the torque tube.

In an example, the invention provides a tracker apparatus comprising a plurality of torque tubes comprising a first torque tube coupled to a second torque tube coupled to an Nth torque tube, whereupon N is an integer greater than 2. Each pair of torque tubes is coupled to each other free from any welds.

In an example, each pair of torque tubes is swaged fitted together. Each of the torque tubes is cylindrical in shape. Each of the plurality of torque tubes is characterized by a length greater than 80 meters. Each of the torque tubes comprises a plurality of notches. In an example, the apparatus also has a plurality of U-bolt devices coupled respectively to the plurality of notches. Each of the plurality of torque tubes are made of steel.

In an alternative embodiment, the present invention provides a tracker apparatus having a pier member comprising a lower region and an upper region. A clamp holding member is configured to the upper region and is capable of moving in at least a first direction, a second direction opposite to the first direction, a third direction normal to the first direction and the second direction, a fourth direction opposite of the third direction, a fifth direction normal to the first direction, the second direction, the third direction, and the fourth direction, and a sixth direction opposite of the fifth direction.

In yet an alternative embodiment, the present invention provides a solar tracker apparatus. The apparatus has a clamp housing member configured in a upright direction. The clamp housing member comprises a lower region and an upper region. The lower region is coupled to a pier structure. The upper region comprises a spherical bearing device. The upright direction is away from a direction of gravity. The apparatus has a clam shell clamp member coupled to the cylindrical bearing and the clam shell clamp being suspended from the cylindrical bearing. In an example, the apparatus has a torque tube comprising a first end and a second end. The first end is coupled to the spherical bearing to support the torque tube from the upper region of the clamp housing member. The torque tube is configured from an off-set position from a center region of rotation. The apparatus has a drive device coupled to the second end such that the drive device and the torque tube are configured to be substantially free from a twisting action while under a load, e.g., rotation, wind, other internal or external forces. Further details of a tracker system can be found in co-pending applications listed as HORIZONTAL BALANCED SOLAR TRACKER by Alexander W. Au, and under PCT/US13/73948, Dec. 9, 2013 and OFF-SET DRIVE ASSEMBLY FOR SOLAR TRACKER by Alexander W. Au, and under U.S. Ser. No. 14/489,409 filed Sep. 17, 2014, each of which is hereby incorporated by reference in its entirety for all purposes.

Also, in an example, elements in the solar tracker can be made of a suitable material such as carbon-hardened steel, among others. Additionally, the term "mass damper" used herein, includes an isolator, that is configured between the torque tube and solar panel to absorb mechanical vibration and also cause destructive interface of any natural resonance in the solar tracker structure when exposed to wind or other ambient conditions. Of course, there can be other variations, modifications, and alternatives to the materials, as well as the use of the mass damper term.

EXAMPLE

Figure 16:
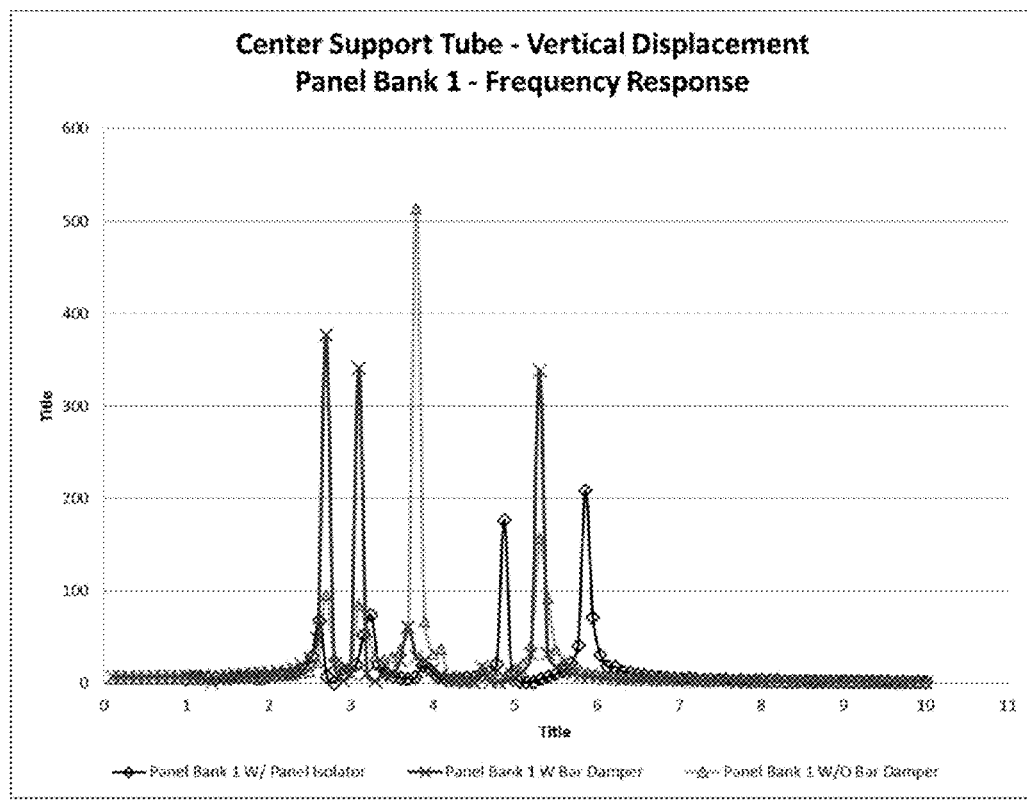
FIGS. 16, 17, and 18 show experimental results using the present mass damper for a plurality of panel banks.
Figure 17:
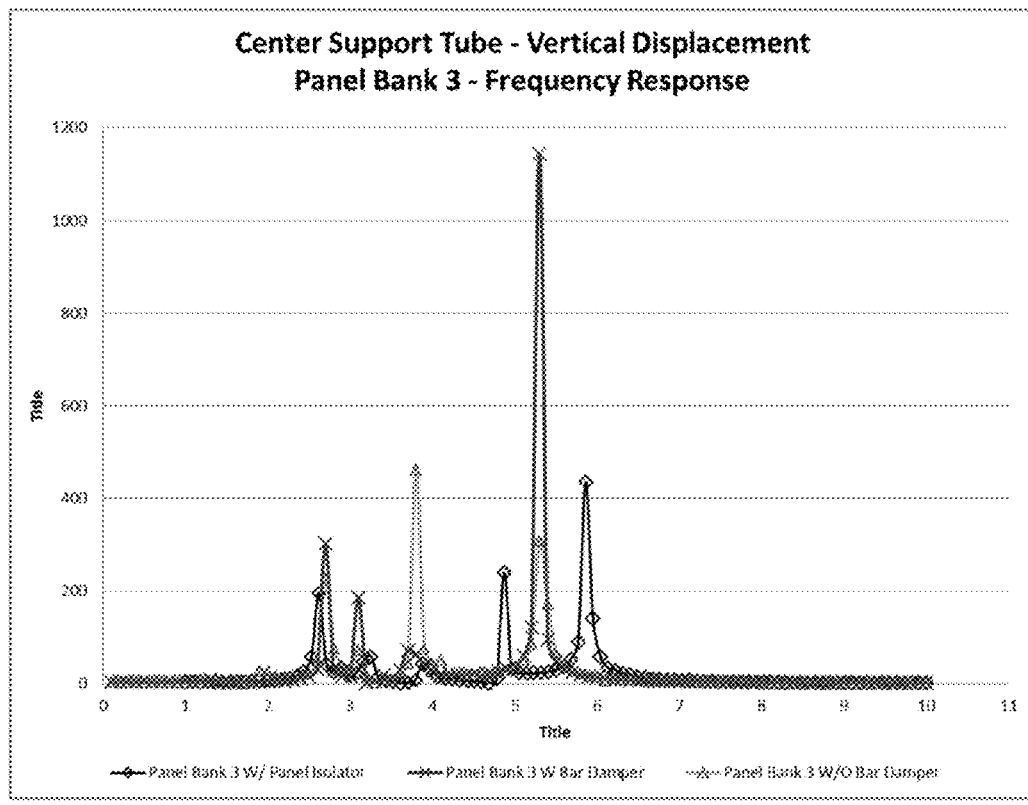
Figure 18:
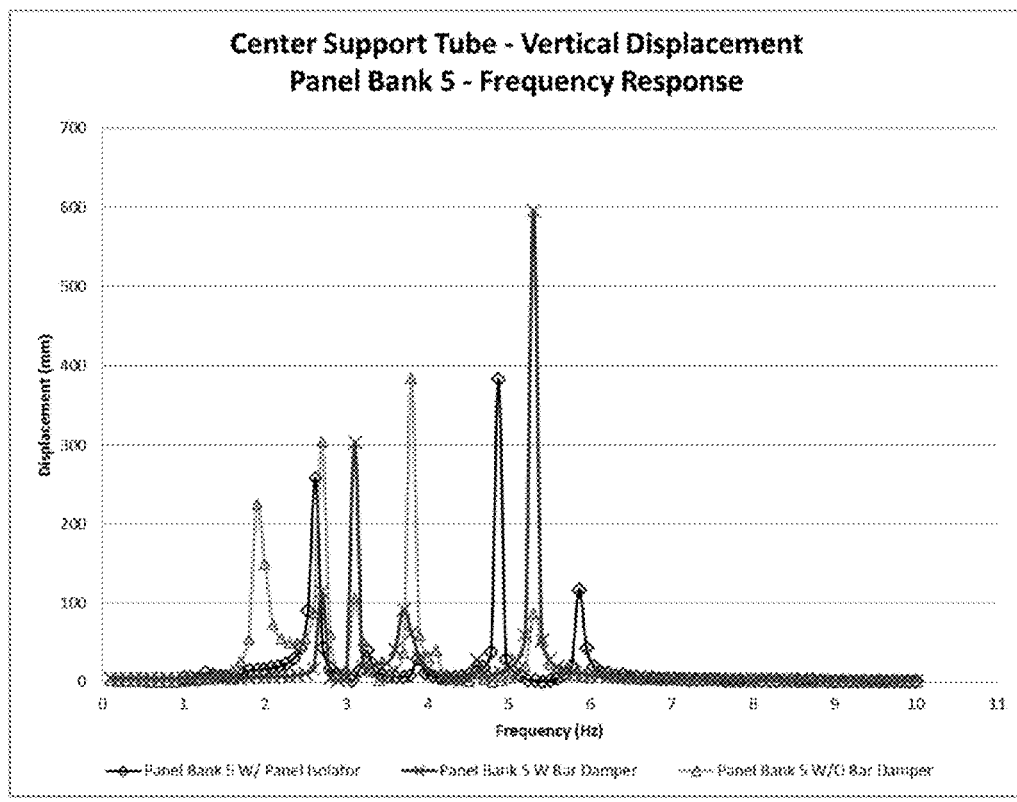

To prove the above examples, we performed simulations of the present tracker system. The tracker system had a plurality of banks on a left hand side of a drive gear, and a plurality of banks on a right hand side of the drive gear. Each of the banks has a plurality of solar panels spatially disposed between a pair of pillar structures. In an example, the left bank has five banks, and each of the banks has at least eight sets of solar panels. Number from the drive gear on the left side, the banks included 1, 2, 3, 4, and 5. A panel isolator or mass damper was added between the panel and torque tube on a center panel in banks 1, 3, and 5. Experiments were performed to illustrate results in FIGS. 16, 17, and 18. As shown, experimental results for movement or frequency response were provided at locations of panel banks 1, 3, and 5. As shown, the use of the panel isolator or mass damper, according to the present example, showed superior results, as compared with no damping or a linear panel damper. Of course, there can be other variations, modifications, and alternatives.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A solar tracker system, the system comprising:
a first pillar structure and a second pillar structure;
a torque tube configured between the first pillar structure and the second pillar structure;
a plurality of solar modules configured spatially along the torque tube from a first end to a second end;
a panel rail configured to support each of the plurality of solar modules;
a clamp device coupled to sandwich the torque tube between a lower portion of the clamp device and each panel rail;
a mass damper structure comprising a mechanical isolator comprising an elastic material configured to separate the panel rail from the torque tube and cause destructive interference with a natural resonant frequency of the system without the mechanical isolator to reduce a mechanical vibration of the system; wherein the mechanical isolator comprises a rubber like material having a thickness; wherein the mechanical isolator comprises a thickness of material having one or more openings to make the mechanical isolator more flexible in characteristics, each of the openings traversing through the thickness of the mechanical isolator, each of the openings being symmetrically and spatially disposed along a length of the mechanical isolator; the mechanical isolator being characterized by a narrow region along a center of the length in relationship to each edge region of the mechanical isolator.

2. The system of claim 1 wherein the mechanical isolator has a thickness of three inches and less, and a width of two inches and less; and is configured to mechanically and electrically isolate the solar module from the torque tube.

3. The system of claim 1 wherein the natural resonant frequency ranges from 1 Hz to 10 Hz in a torsional mode, and 1 Hz to 5 Hz in a bending mode.

4. The system of claim 1 wherein the mechanical isolator comprises a material selected from a rubber material or a polymer material.

5. The system of claim 1 wherein the mechanical vibration leads to failure of the tracker system without the mechanical isolator.

6. The system of claim 1 wherein the mechanical isolator comprises a stiffness to tune a mass and an inertia of the tracker system to reduce the mechanical vibration.

7. The system of claim 1 wherein the mechanical vibration comprises a torsional mode and a bending mode.

8. The system of claim 1 wherein the mechanical vibration is derived from external wind subjected to the tracker system.

9. The system of claim 1 wherein the panel rail comprises a top-hat structure, the top hat structure comprising a top region, which has a pair of openings for the clamp device, and a first side coupled to an edge of a first solar module, and a second side coupled to the mechanical isolator, the second side having a second brim region, the second brim region physically connects to the mechanical isolator, the second side characterized by a second side height and the mechanical isolator having a thickness, the second side height and the thickness are substantially equal to a first side height characterizing the first side, the mechanical isolator being coupled to an edge of a second solar module.

10. The system of claim 1 wherein the panel rail comprises a top-hat structure, the top hat structure comprising a top region, which has a pair of openings for the clamp device, a first side coupled to an edge of a first solar module, and a second side coupled to the mechanical isolator, the second side having a second brim region, the second brim region physically connects to a first edge of the mechanical isolator, the second side characterized by a second side height and the mechanical isolator having a thickness, the second side height and the thickness are substantially equal to a first side height characterizing the first side, the mechanical isolator having a second edge being coupled to an edge of a second solar module; and further comprising a polymeric or rubber bumper structure configured on either the first solar module or second solar module and provided between the first solar module and the second solar module.

11. A solar tracker comprising:
a mass damper structure comprising a mechanical isolator comprising an elastic material configured to separate a panel rail from a torque tube and cause destructive interference with a natural resonant frequency of the solar tracker system without the mechanical isolator to reduce a mechanical vibration of the solar tracker system;
wherein the mechanical isolator comprises a rubber like material having a thickness; wherein the mechanical isolator comprises a thickness of material having one or more openings to make the mechanical isolator more flexible in characteristics, each of the openings traversing through the thickness of the mechanical isolator, each of the openings being symmetrically and spatially disposed along a length of the mechanical isolator; the mechanical isolator being characterized by a narrow region along a center of the length in relationship to each edge region of the mechanical isolator.
wherein mechanical isolator has a thickness of three inches and less, and a width of two inches and less;
wherein the natural resonant frequency ranges from 1 Hz to 10 Hz in a torsional mode, and 1 Hz to 5 Hz in a bending mode;
wherein the mechanical vibration leads to failure of the solar tracker system without the mechanical isolator;
wherein the mechanical vibration is derived from external wind subjected to the solar tracker system.

12. The system of claim 11 further comprising a pair of pillars configured to hold the torque tube; and a clamp assembly coupled to one side of the torque tube and an off-set drive coupled to the other side of the torque tube.

13. The system of claim 12 wherein the mechanical isolator is provided in one of a center solar panels spatially disposed on a panel bank comprising a plurality of solar modules disposed on the torque tube.

14. The system of claim 13 wherein the panel bank is configured between the pair of piers, each of the piers configured with a clamp assembly coupled to the torque tube.

15. The system of claim 14 wherein the panel bank is one of a plurality of panel banks configured on a drive assembly coupled to the torque tube.

16. The system of claim 14 wherein the other plurality of solar modules is free from any mechanical isolator.

17. The system of claim 14 wherein the mechanical isolator comprises a thickness of polymer or rubber material suitable to absorb vibration, and shock, and cause destructive interface for any natural resonance on the system.

* * * * *